United States Patent
Tomioka et al.

(10) Patent No.: US 8,960,449 B2
(45) Date of Patent: Feb. 24, 2015

(54) COMPOSITE SEMIPERMEABLE MEMBRANE AND MANUFACTURING METHOD THEREFOR

(75) Inventors: Hiroki Tomioka, Shiga (JP); Aki Katsuno, Shiga (JP); Masahiro Henmi, Shiga (JP)

(73) Assignee: Toray Industries, Inc., Tokyo (JP)

( * ) Notice: Subject to any disclaimer, the term of this patent is extended or adjusted under 35 U.S.C. 154(b) by 169 days.

(21) Appl. No.: 13/056,990

(22) PCT Filed: Oct. 26, 2009

(86) PCT No.: PCT/JP2009/068311
§ 371 (c)(1),
(2), (4) Date: Feb. 1, 2011

(87) PCT Pub. No.: WO2010/050421
PCT Pub. Date: May 6, 2010

(65) Prior Publication Data
US 2011/0132834 A1 Jun. 9, 2011

(30) Foreign Application Priority Data

Oct. 31, 2008 (JP) .................................. 2008-281123

(51) Int. Cl.
| | | |
|---|---|---|
| B01D 39/00 | (2006.01) | |
| B01D 29/00 | (2006.01) | |
| B01D 67/00 | (2006.01) | |
| B01D 29/46 | (2006.01) | |
| B29C 44/04 | (2006.01) | |
| B05D 5/00 | (2006.01) | |
| C08J 9/26 | (2006.01) | |
| B01D 71/56 | (2006.01) | |
| B01D 69/12 | (2006.01) | |
| B01D 71/08 | (2006.01) | |
| C02F 1/44 | (2006.01) | |

(52) U.S. Cl.
CPC .............. *B01D 71/56* (2013.01); *B01D 69/125* (2013.01); *B01D 71/08* (2013.01); *B01D 2323/30* (2013.01); *C02F 1/444* (2013.01)
USPC ........ 210/500.38; 210/490; 264/49; 427/244; 427/245

(58) Field of Classification Search
CPC .... B01D 71/56; B01D 61/025; B01D 61/027; B01D 2323/30; B01D 2323/40; C02F 1/441; C02F 2103/08; C02F 1/444; C02F 1/445; C02F 1/44; C02F 1/442; C02F 2101/108; C02F 1/001; C02F 1/40; C02F 1/42

USPC ............ 210/500.37, 500.38, 490; 264/48–49; 427/244–245
See application file for complete search history.

(56) References Cited

U.S. PATENT DOCUMENTS

| | | | |
|---|---|---|---|
| 4,769,148 A | | 9/1988 | Fibiger et al. |
| 4,948,507 A | * | 8/1990 | Tomaschke .............. 210/500.38 |
| 4,983,291 A | * | 1/1991 | Chau et al. ..................... 210/490 |
| 5,658,460 A | * | 8/1997 | Cadotte et al. ........... 210/500.38 |
| 6,162,358 A | * | 12/2000 | Li et al. .................... 210/500.38 |
| 6,319,404 B1 | * | 11/2001 | Zhang et al. ............. 210/500.29 |
| 7,643,054 B2 | * | 1/2010 | Griss et al. ..................... 348/148 |
| 7,727,434 B2 | * | 6/2010 | Kniajanski et al. ............. 264/48 |
| 7,749,385 B2 | * | 7/2010 | Kloos et al. .................... 210/651 |
| 2007/0039874 A1 | * | 2/2007 | Kniajanski et al. ...... 210/500.37 |
| 2007/0170179 A1 | * | 7/2007 | Segiet et al. .................. 219/679 |
| 2008/0251447 A1 | | 10/2008 | Koumoto et al. |
| 2009/0078640 A1 | * | 3/2009 | Chu et al. .................... 210/321.6 |
| 2011/0132834 A1 | * | 6/2011 | Tomioka et al. .............. 210/490 |

FOREIGN PATENT DOCUMENTS

| | | |
|---|---|---|
| EP | 0 992 277 A1 | 4/2000 |
| JP | 1-130707 A | 5/1989 |
| JP | 2727087 B2 | 3/1998 |
| JP | 11-333268 A | 12/1999 |
| JP | 2000-117074 A | 4/2000 |
| JP | 2002-224539 A | 8/2002 |
| JP | 2008-93543 A | 4/2008 |

OTHER PUBLICATIONS

International Search Report PCT/JP2009/068311 issued Jan. 19, 2010.

* cited by examiner

*Primary Examiner* — Ana Fortuna
(74) *Attorney, Agent, or Firm* — Birch, Stewart, Kolasch & Birch, LLP

(57) ABSTRACT

In manufacturing a composite semipermeable membrane useful for separating a liquid mixture selectively, it is rendered possible to provide a composite semipermeable membrane that exhibits reduced deterioration of water permeability and solute removing property as a result of drying and that demonstrates reduced economic burden and load for waste liquid treatment without impairing the water permeability or solute removal ratio of the composite semipermeable membrane through change of the membrane manufacturing method, by making a saccharide exist in an aqueous polyfunctional amine solution in performing interfacial polycondensation by bringing the aqueous solution of the polyfunctional amine into contact with an organic solvent solution containing a polyfunctional acid halide on a microporous support membrane.

16 Claims, No Drawings

COMPOSITE SEMIPERMEABLE MEMBRANE AND MANUFACTURING METHOD THEREFOR

TECHNICAL FIELD

The present invention relates to a composite semipermeable membrane useful for separating a liquid mixture selectively, and relates to, for example, a composite semipermeable membrane which exhibits only a small change in quality due to drying and in which a separating functional polyamide layer has been formed on a microporous support membrane, and a method for manufacturing the same.

BACKGROUND ART

In recent years, desalting seawater or brackish water using a composite semipermeable membrane has been tried, and now, it has been put into practical use in water plants all over the world. Composite semipermeable membranes each comprise a microporous support membrane coated with a separating functional layer, and it is known that when the separating functional layer is formed from a crosslinked aromatic polyamide, there is an advantage that it is high in stiffness because of containing benzene rings and a membrane can be produced readily by interfacial polycondensation of an aqueous aromatic polyfunctional amine solution and an organic solvent solution of an aromatic polyfunctional acid halide, and a high salt removal ratio and a high permeation flow are exhibited.

However, when a composite semipermeable membrane produced by forming a separating functional polyamide layer on a microporous support membrane is dried, it develops quality changes, such as decrease in water permeability or solute removal ratio, and therefore it is necessary to keep moisture during the storage thereof. Although a method in which interfacial polymerization of an aqueous solution of a polyfunctional amine and an organic solvent solution of a polyfunctional acid halide is performed in the presence of a macromolecular wetting agent having two or more ionic portions (Patent document 1), for example, is disclosed as a method of preventing quality changes caused by drying, a composite semipermeable membrane obtained by this method undesirably tends to become lower in solute removal ratio than a membrane obtained in the absence of such a macromolecular wetting agent. In addition, there is disclosed a method in which a composite semipermeable membrane obtained by interfacial polymerization of an aqueous solution of a polyfunctional amine and an organic solvent solution of a polyfunctional acid halide is immersed in a solution of a saccharide having a molecular weight of 1000 or less (Patent document 2). However, it is necessary for this method to use a saccharide solution with a high concentration of 5% by weight or more, and therefore there is a problem that an economic burden and a load for waste liquid treatment increase.

PRIOR ART DOCUMENTS

Patent Documents

Patent document 1: Japanese Patent No. 2727087
Patent document 2: JP 2000-117074 A

SUMMARY OF THE INVENTION

Problems to be Solved by Invention

An object of the present invention is to avoid impairing the water permeability or the solute removal ratio of a composite semipermeable membrane by changing a membrane production method and to provide a composite semipermeable membrane whose quality is hardly deteriorated by drying by a method that results in a reduced economic burden and a reduced load for waste liquid treatment.

Means for Solving Problems

The present invention for attaining the above-mentioned object takes the following configurations.
(1) A composite semipermeable membrane produced by forming a separating functional polyamide layer on a microporous support membrane, wherein the polyamide constituting the separating functional polyamide layer is a cross linked polyamide obtained by bringing an aqueous solution containing a polyfunctional amine and a saccharide into contact with an organic solvent solution containing a polyfunctional acid halide on the microporous support membrane to perform interfacial polycondensation.
(2) The composite semipermeable membrane according to the above-mentioned (1), wherein the saccharide is at least one selected from among monosaccharides, disaccharides, and trisaccharides.
(3) The composite semipermeable membrane according to the above-mentioned (1), wherein the saccharide is at least one selected from among glucose, sucrose, maltose, lactose, trehalose, and raffinose.
(4) A method for manufacturing a composite semipermeable membrane produced by forming a separating functional membrane produced by forming a separating functional polyamide layer on a microporous support membrane, wherein a crosslinked polyamide constituting the separating functional polyamide layer is formed by bringing an aqueous solution containing a polyfunctional amine and a saccharide into contact with an organic solvent solution containing a polyfunctional acid halide on the microporous support membrane to perform interfacial polycondensation.
(5) The method for manufacturing a composite semipermeable membrane according to the above-mentioned (4), wherein the saccharide is at least one selected from among monosaccharides, disaccharides, and trisaccharides.
(6) The method for manufacturing a composite semipermeable membrane according to the above-mentioned (4), wherein the saccharide is at least one selected from among glucose, sucrose, maltose, lactose, trehalose, and raffinose.

Effect of the Invention

According to the present invention, a composite semipermeable membrane whose water permeability and solute removing property are hardly impaired by drying can be obtained. Moreover, the economic burden and the load for waste liquid treatment can be reduced because the amounts of the chemicals needed are small.

MODE FOR CARRYING OUT THE INVENTION

The present invention gives moisture retention to a composite semipermeable membrane that has a separating functional layer formed of a crosslinked polyamide.

In the present invention, a composite semipermeable membrane is preferably a membrane in which a microporous support membrane having substantially no separating performance is coated with a separating functional layer substantially having separating performance, wherein the separating functional layer is formed of a crosslinked polyamide obtained by bringing a polyfunctional amine into contact with a polyfunctional acid halide in the presence of a saccharide to make them undergo interfacial polycondensation. Herein, the polyfunctional amine is composed of at least one component selected from among aliphatic polyfunctional amines and aromatic polyfunctional amines.

The aliphatic polyfunctional amine is an aliphatic amine that has two or more amino groups in a molecule and it preferably is a piperazine-based amine or its derivative. Piperazine, 2,5-dimethylpiperazine, 2-methylpiperazine, 2,6-dimethylpiperazine, 2,3,5-trimethylpiperazine, 2,5-diethylpiperazine, 2,3,5-triethylpiperazine, 2-n-propylpiperazine, and 2,5-di-n-butylpiperazine are listed as examples, and particularly, piperazine and 2,5-dimethylpiperazine are preferred in view of the stability of performance development.

The aromatic polyfunctional amine is an aromatic amine that has two or more amino groups in a molecule, and it includes, but is not particularly limited to, m-phenylenediamine, p-phenylenediamine, and 1,3,5-triaminobenzene, and N,N-dimethyl-m-phenylenediamine, N,N-diethyl-m-phenylenediamine, N,N-dimethyl-p-phenylenediamine, and N,N-diethyl-p-phenylenediamine are listed as examples of its N-alkylated derivative. In view of the stability of performance development, m-phenylenediamine and 1,3,5-triaminobenzene are particularly preferred.

The polyfunctional acid halide is an acid halide that has two or more halogenated carbonyl groups in a molecule, and it is not particularly restricted if it is capable of affording a polyamide through a reaction with the above-mentioned amine. As the polyfunctional acid halide, acid halides of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, and 1,4-benzenedicarboxylic acid, for example, can be used. Among acid halides, acid chlorides are preferred, and trimesoyl chloride, which is an acid halide of 1,3,5-benzenetricarboxylic acid, is particularly preferred in view of economical efficiency, ease of acquisition, ease of handling, ease of reaction, and so on. Although the above-mentioned polyfunctional acid halide can be used solely, it may be used in the form of a mixture.

The organic solvent in which the polyfunctional acid halide is to be dissolved preferably is immiscibility with water and does not destroy a microporous support membrane, and it may be any one that does not inhibit a crosslinked polyamide-formation reaction. Liquid hydrocarbons and halogenated hydrocarbons, such as trichlorofluoroethane, are provided as representative examples; considering the fact of being a substance that does not destroy the ozone layer, ease of acquisition, ease of handling, and safety on handling, simple substances of octane, nonane, decane, undecane, dodecane, tridecane, tetradecane, heptadecane, hexadecane, cyclooctanes, ethylcyclohexane, 1-octene, and 1-decene, or their mixtures are preferably used.

The saccharide is not particularly restricted unless it hinders the reaction between the above-mentioned polyfunctional amine and the polyfunctional acid halide, and examples thereof include monosaccharides, disaccharides, and trisaccharide as well as starch, glycogen, pectin, and agarose. Among these, monosaccharides, disaccharides, and trisaccharides are preferred because they can inhibit the increase in viscosity of an aqueous solution of the polyfunctional amine caused by their dissolution and good membrane production can be performed, and glucose, sucrose, maltose, lactose, trehalose, and raffinose are more preferred especially in view of their economical efficiency, ease of acquisition, and ease of handling.

In the present invention, a microporous support membrane is a material that does not substantially have performance to separate ions, and so on and imparts strength to a separating functional layer that substantially has separating performance. Although the size and distribution of pores are not particularly limited, preferred is, for example, a support membrane that has uniform fine pores or fine pores that gradually become larger from the surface where a separating functional layer is to be formed to the other surface, wherein the size of the fine pores on the surface where the separating functional layer is to be formed is from 0.1 nm to 100 nm.

Although neither the material to be used for a microporous support membrane nor the form of the microporous support membrane is not particularly limited, a membrane that has been formed by casting a resin onto a support (substrate) can be provided as an example. Examples of the substrate include a textile whose principal component is at least one kind of material selected from among polyesters and aromatic polyamides. As to the kind of the resin which is to be cast onto the substrate, a polysulfone, for example, a cellulose acetate, a polyvinyl chloride, or a mixture thereof is used preferably, and it is particularly preferred to use a polysulfone, which is chemically, mechanically, and thermally stable.

Specifically, the use of a polysulfone composed of the repeating unit represented by the following chemical formula is preferred because this makes it easy to control a pore size and dimensional stability is high.

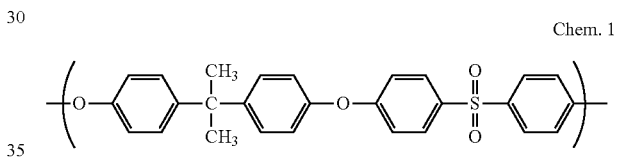

Chem. 1

Although the microporous support membrane to be used for the present invention may be selected from various commercially available materials, such as "Millipore Membrane Filter VSWP" (trade name) produced by Millipore and "Ultrafilter UK10" (trade name) produced by Toyo Roshi Co., Ltd., it can be produced in accordance with the method disclosed in "Office of Saline Water Research and Development Progress Report" No. 359 (1968).

For example, a microporous support membrane having a microporous support most part of the surface of which has fine pores of several tens nm or less in diameter can be obtained by casting an N,N-dimethylformamide (DMF) solution of the above-mentioned polysulfone in a certain thickness on a densely woven polyester cloth or a nonwoven fabric (substrate), and then solidifying it by a wet process in an aqueous solution containing 0.5% by weight of sodium dodecyl sulfate and 2% by weight of DMF.

The thickness of the above-mentioned microporous support and that of the substrate affect the strength of a composite semipermeable membrane and the packing density when it is used as an element. In order to obtain sufficient mechanical strength and packing density, the total thickness of the microporous support and the substrate preferably falls within the range of from 50 to 300 μm and more preferably falls within the range of 100 to 250 μm. Moreover, the thickness of the microporous support is preferably within the range of from 10 to 200 μm, and more preferably within the range of from 30 to 100 μm.

The form of a microporous support membrane can be observed by means of a scanning electron microscope, a transmission electron microscope, or an atomic force microscope. For example, if the observation is carried out using a scanning electron microscope, the microporous support is peeled away from the substrate, and then it is sectioned by a freeze-sectioning method to produce a sample for cross-sectional observation. This sample is thinly coated with platinum, platinum-palladium, or ruthenium tetrachloride, preferably with ruthenium tetrachloride, and then is observed with a high resolution field emission type scanning electron microscope (UHR-FE-SEM) at an acceleration voltage of 3 to 6 kV. For the high resolution field emission type scanning electron microscope, there can be used S-900 type electron microscope manufactured by Hitachi Ltd., and so on. The membrane thickness of the microporous support and the diameter of the surface pores are determined from an electron micrograph obtained. The thickness and the pore size in the present invention mean averages of values measured at ten points extracted at random.

Next, a preferred method for manufacturing a composite semipermeable membrane is explained. A separating functional layer that substantially has separating performance in a composite semipermeable membrane is formed, for example, by using an aqueous solution containing the above-mentioned polyfunctional amine and a water-immiscible organic solvent solution containing the above-mentioned polyfunctional acid halide, and bringing them into contact with each other on the below-mentioned microporous support membrane to make them undergo interfacial polycondensation.

The aqueous solution containing a polyfunctional amine and the organic solvent solution containing a polyfunctional acid halide may, if needed, contain compounds, such as an acylation catalyst, a polar solvent, an acid scavenger, a surfactant, and an antioxidant, as long as they do not inhibit the reaction between both the components.

In the present invention, a microporous support membrane is used in order to support a separating functional layer of a crosslinked polyamide, or the like. Although the composition of the microporous support membrane is not particularly limited, the above-mentioned polysulfone support membrane reinforced with a textile can be provided as an example of a preferred microporous support membrane.

The present invention is characterized in that in the step of making a microporous support membrane contain an aqueous polyfunctional amine solution, a saccharide is made to be contained in the aqueous polyfunctional amine solution. The method of making an aqueous polyfunctional amine solution contain a saccharide is not particularly limited, and it is possible to make an aqueous polyfunctional amine solution contain a saccharide, for example, by dissolving the saccharide in the solution. Here, the polyfunctional amine concentration of the aqueous solution containing the polyfunctional amine and the saccharide is preferably 0.1 to 20% by weight, and more preferably 0.5 to 15% by weight. The saccharide concentration of this aqueous solution is preferably 0.1 to 5% by weight, and more preferably 0.1 to 3% by weight. Thus, in the present invention, the fall of membrane performance due to drying can be prevented by a simple method of making a saccharide to be contained in an aqueous polyfunctional amine solution. Since it is not necessary to use a saccharide in a large amount like conventional methods, it is possible to reduce the economic burden and the load for waste liquid treatment.

Subsequently, the aqueous solution applied superfluously is fully drained so that droplets may not remain on the membrane. By fully draining, it is possible to prevent membrane performance from falling through the formation of membrane defects from droplet-remaining parts after the membrane formation. Examples of the method of draining include a method that comprises holding the membrane surface in a vertical direction to make droplets flow spontaneously. As a method of draining, there can be used, for example, a method of holding a microporous support membrane after its contact with an aqueous polyfunctional amine solution in the vertical direction, making an excess aqueous solution flow down spontaneously as disclosed in JP 2-78428 A, or a method of draining compulsorily by spraying air flow of nitrogen or the like from an air nozzle. After draining, it is also permissible to remove part of the water of the aqueous solution by drying the membrane surface.

Then, a separating functional layer of a crosslinked polyamide is formed by applying an organic solvent solution containing the above-mentioned polyfunctional acid halide to the microporous support membrane containing the polyfunctional amine and the saccharide and performing interfacial polycondensation.

The concentration of the polyfunctional acid halide in the organic solvent solution is preferably within the range of 0.01 to 10% by weight, and more preferably within the range of 0.02 to 2.0% by weight. When the concentration is within this range, a sufficient reaction rate can be obtained and the generation of side reactions can be inhibited. Moreover, it is more preferred to make the organic solvent solution contain an acylation catalyst, such as N,N-dimethylformamide, because interfacial polycondensation is thereby promoted.

After bringing the organic solvent solution of the polyfunctional acid halide into contact with the microporous support membrane to perform interfacial polycondensation and thereby forming the separating functional layer containing the crosslinked polyamide on the microporous support membrane, it is recommended to drain an excess solvent. As a method of draining, there can be used a method of removing an excess organic solvent by allowing it to flow down spontaneously by holding the membrane in the vertical direction. In this case, the time of holding in the vertical direction is preferably within the range of from 1 to 5 minutes and more preferably from 1 to 3 minutes. If it is excessively short, a separating functional layer is not formed completely, whereas if it excessively long, the organic solution is overdried, so that defects are prone to be generated and the performance is prone to fall.

By subjecting the composite semipermeable membrane obtained by the above-mentioned method to, for example, a step of hot water treatment in a range of from 50 to 150° C., preferably in a range of from 70 to 130° C., for from 1 to 10 minutes, preferably from 2 to 8 minutes, it is possible to improve the solute blocking performance and water permeability of the composite semipermeable membrane.

The composite semipermeable membrane of the present invention formed in such a way is used suitably as a spiral type composite semipermeable membrane element by wrapping therewith a cylindrical strainer pipe with many holes, together with a feed water channel material, such as a plastic net, a permeated channel material, such as tricot, and optionally a membrane for enhancing resistance to pressure. Moreover, there can be formed a composite semipermeable membrane module in which this type of elements are connected in series or in parallel and installed in a pressure container.

Also, the above-mentioned composite semipermeable membrane, its element, or its module can constitute a fluid separation device in combination with a pump for feeding crude water thereto, a device for pre-treating the crude water, and so on. By the use of this separation device, it is possible to separate raw water into permeated water, such as drinking water, and concentrated water that has not permeated through the membrane, thereby obtaining suitable water.

EXAMPLES

The present invention is hereinafter illustrated in more detail by way of Examples, but the present invention is not limited by the Examples at all.

The characteristics of the membranes in Referential Examples, Comparative Examples, and Examples were determined from the following formulae by subjecting the composite semipermeable membranes to membrane filtration treatment by supplying sea water (salt concentration: about 3.5%) adjusted to a temperature of 25° C. and a pH of 6.5, at an operation pressure of 5.5 MPa, and measuring the water quality of the permeated water and the supplied water.

(Salt Permeation Ratio)

Salt permeation ratio(%)=100×(salt concentration in permeated water/salt concentration in supplied water)

(Membrane Permeation Flow Rate)

The amount of membrane permeated water of the supplied water (sea water) was represented by a membrane penetration flow rate ($m^3/m^2$/day), which was the permeated water amount ($m^3$) per square meter of the membrane surface, per day.

(Change Ratio Before and after Air Drying)

A composite semipermeable membrane was dried in air at room temperature for 60 minutes and then was subjected to the above-mentioned membrane filtration treatment and evaluation of the salt permeation ratio and the membrane permeation flow rate, for each of which, the change ratio was calculated from (the value after air drying/the value before air drying).

Example 1

A textile-reinforced polysulfone support membrane (ultrafiltration membrane), which was a microporous support membrane, was manufactured by the following procedure. Namely, a microporous support membrane of polysulfone was manufactured by fixing, onto a glass plate, a wet-process nonwoven fabric having an air permeability of 0.7 $cm^3/cm^2$/sec, an average pore diameter of 7 μm or less, and dimensions of 30 cm in length and 20 cm in width, made of a combined filament yarn of a polyester fiber with a single yarn fineness of 0.5 dtex and a polyester fiber of 1.5 dtex, then casting thereon a solution (20° C.) having a polysulfone concentration of 15% by weight in dimethylformamide (DMF) solvent, and immediately immersing the resultant in water. The obtained microporous support membrane is described as PS support membrane.

The PS support membrane obtained in this way was immersed in an aqueous solution containing 3.8% by weight of m-phenylenediamine (henceforth referred to as mPDA) and 1.0% by weight of trehalose at room temperature for 2 minutes, and it was pulled up slowly so that an excess aqueous solution might not remain on the surface of this support membrane. A n-decane solution containing 0.175% by weight of trimesoyl chloride (hereinafter, TMC) was applied thereto at a rate of 160 $cm^3/m^2$ so that the surface of the support membrane might be get wet completely, and was left at rest for 1 minute. Next, in order to remove an excess solution from the membrane, the membrane was held vertically for one minute, so that an excess solution on the membrane was drained, and then n-decane on the surface of the membrane was removed with a blower at room temperature. Then, the membrane was washed with hot water of 90° C. for 2 minutes, so that a composite semipermeable membrane was obtained. The composite semipermeable membrane obtained in this way was evaluated to be found that the membrane permeation flow rate was 0.75 ($m^3/m^2$/day), and the salt permeation ratio was 0.24%. The obtained composite semipermeable membrane was dried in air at room temperature for 60 minutes and then was evaluated. As a result, it was found that the membrane permeation flow rate was 0.70 ($m^3/m^2$/day), the salt permeation ratio was 0.26%, so that the change ratio of the membrane permeation flow rate from before drying was 0.94 and the change ratio of the salt permeation ratio was 1.08.

Examples 2 to 6

A composite semipermeable membrane was obtained in the same manner as in Example 1 except for adding a saccharide shown in Table 1 to an aqueous mPDA solution instead of trehalose. When the composite semipermeable membrane obtained in this way was evaluated, the result shown in Table 1 was obtained and it was found that it had good performance and that the change ratios before and after air drying were small.

TABLE 1

| Example No. | Saccharide | Before air drying | | After air drying | | Change ratio before and after air drying | |
|---|---|---|---|---|---|---|---|
| | | Salt permeation ratio % | Membrane permeation flow rate $m^3/m^2$/day | Salt permeation ratio % | Membrane permeation flow rate $m^3/m^2$/day | Salt permeation ratio — | Membrane permeation flow rate — |
| Example 1 | trehalose | 0.24 | 0.75 | 0.26 | 0.70 | 1.08 | 0.94 |
| Example 2 | glucose | 0.28 | 0.79 | 0.29 | 0.71 | 1.04 | 0.90 |
| Example 3 | sucrose | 0.27 | 0.77 | 0.31 | 0.72 | 1.15 | 0.94 |
| Example 4 | maltose | 0.27 | 0.74 | 0.30 | 0.68 | 1.11 | 0.92 |
| Example 5 | lactose | 0.29 | 0.70 | 0.33 | 0.64 | 1.13 | 0.91 |
| Example 6 | raffinose | 0.27 | 0.74 | 0.31 | 0.67 | 1.15 | 0.91 |
| Comparative Example 1 | none | 0.26 | 0.68 | 0.42 | 0.59 | 1.33 | 0.87 |
| Comparative Example 2 | pectin | Unable to measure because of poor film forming property | | | | | |

Comparative Example 1

A composite semipermeable membrane was obtained in the same manner as in Example 1 except for failing to add trehalose. The composite semipermeable membrane obtained in this way was evaluated to be found that the membrane permeation flow rate was 0.68 (m³/m²/day), and the salt permeation ratio was 0.26%. The obtained composite semipermeable membrane was dried in air at room temperature for 60 minutes and then was evaluated. As a result, it was found that the membrane permeation flow rate was 0.59 (m³/m²/day), the salt permeation ratio was 0.42%, so that the change ratio of the membrane permeation flow rate from before drying was 0.87 and the change ratio of the salt permeation ratio was 1.33.

Comparative Examples 2

Membrane formation was performed in the same manner as in Example 1 except for adding pectin to an aqueous mPDA solution instead of trehalose. However, the viscosity of the aqueous mPDA solution to which pectin had been added became so high that it was difficult to remove an excess aqueous solution from the surface of a PS support membrane after the PS support membrane was immersed in the aqueous solution at room temperature for 2 minutes, and for this reason, a composite semipermeable membrane was not formed.

From the results of the Examples and the Comparative Examples, it is shown that the decrease in the permeated water volume due to drying is reduced by producing a composite semipermeable membrane by bringing an aqueous solution containing a polyfunctional amine and a saccharide into contact with an organic solvent solution containing a polyfunctional acid halide on a microporous support membrane.

The invention claimed is:

1. A composite semipermeable membrane produced by forming a separating functional polyamide layer on a microporous support membrane, wherein the polyamide constituting the separating functional polyamide layer is a crosslinked polyamide obtained by bringing an aqueous solution containing a polyfunctional amine and a saccharide into contact with an organic solvent solution containing a polyfunctional acid halide on the microporous support membrane to perform interfacial polycondensation, and wherein the aqueous solution contains the saccharide in an amount of 0.1 to 5% by weight.

2. The composite semipermeable membrane according to claim 1, wherein the saccharide is at least one selected from among monosaccharides, disaccharides, and trisaccharides.

3. The composite semipermeable membrane according to claim 1, wherein the saccharide is at least one selected from among glucose, sucrose, maltose, lactose, trehalose, and raffinose.

4. The composite semipermeable membrane according to claim 3, wherein the polyfunctional amine is selected from the group consisting of piperazine, 2,5-dimethylpiperazine, 2-methylpiperazine, 2,6-dimethylpiperazine, 2,3,5-trimethylpiperazine, 2,5-diethylpiperazine, 2,3,5-triethylpiperazine, 2-n-propylpiperazine, 2,5-di-n-butylpiperazine, m-phenylenediamine, p-phenylenediamine, 1,3,5-triaminobenzene, N,N-dimethyl-m-phenylenediamine, N,N-diethyl-m-phenylenediamine, N,N-dimethyl-p-phenylenediamine, and N,N-diethyl-p-phenylenediamine; and wherein the polyfunctional acid halide is selected from the group consisting of acid halides of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, and 1,4-benzenedicarboxylic acid.

5. The composite semipermeable membrane according to claim 1, wherein the polyfunctional amine is selected from the group consisting of piperazine, 2,5-dimethylpiperazine, 2-methylpiperazine, 2,6-dimethylpiperazine, 2,3,5-trimethylpiperazine, 2,5-diethylpiperazine, 2,3,5-triethylpiperazine, 2-n-propylpiperazine, 2,5-di-n-butylpiperazine, m-phenylenediamine, p-phenylenediamine, 1,3,5-triaminobenzene, N,N-dimethyl-m-phenylenediamine, N,N-diethyl-m-phenylenediamine, N,N-dimethyl-p-phenylenediamine, and N,N-diethyl-p-phenylenediamine.

6. The composite semipermeable membrane according to claim 1, wherein the polyfunctional acid halide is selected from the group consisting of acid halides of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, and 1,4-benzenedicarboxylic acid.

7. The composite semipermeable membrane according to claim 1, wherein the aqueous solution contains the polyfunctional amine in an amount of 0.1 to 20% by weight.

8. The composite semipermeable membrane according to claim 1, wherein the aqueous solution contains the polyfunctional amine in an amount of 0.5 to 15% by weight and the saccharide in an amount of 0.1 to 3% by weight.

9. A method for manufacturing a composite semipermeable membrane produced by forming a separating functional polyamide layer on a microporous support membrane, wherein a crosslinked polyamide constituting the separating functional polyamide layer is formed by bringing an aqueous solution containing a polyfunctional amine and a saccharide into contact with an organic solvent solution containing a polyfunctional acid halide on the microporous support membrane to perform interfacial polycondensation, and wherein the aqueous solution contains the saccharide in an amount of 0.1 to 5% by weight.

10. The method for manufacturing a composite semipermeable membrane according to claim 9, wherein the saccharide is at least one selected from among monosaccharides, disaccharides, and trisaccharides.

11. The method for manufacturing a composite semipermeable membrane according to claim 9, wherein the saccharide is at least one selected from among glucose, sucrose, maltose, lactose, trehalose, and raffinose.

12. The method for manufacturing a composite semipermeable membrane according to claim 6, wherein the polyfunctional amine is selected from the group consisting of piperazine, 2,5-dimethylpiperazine, 2-methylpiperazine, 2,6-dimethylpiperazine, 2,3,5-trimethylpiperazine, 2,5-diethylpiperazine, 2,3,5-triethylpiperazine, 2-n-propylpiperazine, 2,5-di-n-butylpiperazine, m-phenylenediamine, p-phenylenediamine, 1,3,5-triaminobenzene, N,N-dimethyl-m-phenylenediamine, N,N-diethyl-m-phenylenediamine, N,N-dimethyl-p-phenylenediamine, and N,N-diethyl-p-phenylenediamine; and wherein the polyfunctional acid halide is selected from the group consisting of acid halides of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, and 1,4-benzenedicarboxylic acid.

13. The method for manufacturing a composite semipermeable membrane according to claim 9, wherein the polyfunctional amine is selected from the group consisting of piperazine, 2,5-dimethylpiperazine, 2-methylpiperazine, 2,6-dimethylpiperazine, 2,3,5-trimethylpiperazine, 2,5-diethylpiperazine, 2,3,5-triethylpiperazine, 2-n-propylpiperazine, 2,5-di-n-butylpiperazine, m-phenylenediamine, p-phenylenediamine, 1,3,5-triaminobenzene, N,N-dimethyl-m-phenylenediamine, N,N-diethyl-m-phenylenediamine, N,N-dimethyl-p-phenylenediamine, and N,N-diethyl-p-phenylenediamine.

14. The method for manufacturing a composite semipermeable membrane according to claim 9, wherein the polyfunctional acid halide is selected from the group consisting of acid halides of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, and 1,4-benzenedicarboxylic acid.

15. The method for manufacturing composite semipermeable membrane according to claim 9, wherein the aqueous solution contains the polyfunctional amine in an amount of 0.1 to 20% by weight.

16. The method for manufacturing composite semipermeable membrane according to claim 9, wherein the aqueous solution contains the polyfunctional amine in an amount of 0.5 to 15% by weight and the saccharide in an amount of 0.1 to 3% by weight.

\* \* \* \* \*